(12) United States Patent
Yang et al.

(10) Patent No.: US 6,415,260 B1
(45) Date of Patent: Jul. 2, 2002

(54) DYNAMIC CAPACITY DEMAND FORECAST SYSTEM

(75) Inventors: Tseng-Hsiang Yang, Taipei; Hsueh-Cheng Wu, Hsinchu, both of (TW)

(73) Assignee: Taiwan Semiconductor Manufacturing Co., LTD (TW)

( * ) Notice: Subject to any disclaimer, the term of this patent is extended or adjusted under 35 U.S.C. 154(b) by 0 days.

(21) Appl. No.: 09/295,726

(22) Filed: Apr. 21, 1999

(51) Int. Cl.[7] ............................................... G06F 17/60
(52) U.S. Cl. ................... 705/10; 705/7; 705/8
(58) Field of Search ................... 705/10, 7, 8

(56) References Cited

U.S. PATENT DOCUMENTS

| | | | | |
|---|---|---|---|---|
| 5,818,716 A | * | 10/1998 | Chin et al. | 364/468.06 |
| 5,825,650 A | * | 10/1998 | Wang | 364/468.06 |
| 5,889,673 A | * | 3/1999 | Pan et al. | 364/468.03 |
| 5,943,484 A | * | 8/1999 | Milne et al. | 395/500 |
| 6,128,588 A | * | 10/2000 | Chacon | 703/6 |

FOREIGN PATENT DOCUMENTS

WO    WO-00/25459 A1 * 5/2000 ........... G06F/19/00

OTHER PUBLICATIONS

Thompson, Simulation–based scheduling: Meeting the semiconductor wafer fabrication challenge, May 1996, IIe Solutions, vol. 28 No. 5, pp. 30–34.*

Baylis, Fab planning: trading in your spreadsheet, Oct. 1998, Solid State Technology, vol. 41 No. 10, pp. 131–134.*

Uzsoy, Shop–floor control (A Review of Production Planning and Scheduling MOdels in the Semiconductor Industry, part 2), Sep. 1994, IIE Transactions, vol. 26, No. 5, pp. 44–55.*

* cited by examiner

*Primary Examiner*—Tariq R. Hafiz
*Assistant Examiner*—Christopher L. Gilligan
(74) *Attorney, Agent, or Firm*—Powell, Goldstein, Frazer & Murphy LLP

(57) ABSTRACT

A dynamic-capacity-demand-forecast system in the manufacture of semiconductor integrated circuits includes several steps. N types of products and m types of processing steps are in a processing line. The turn ratio of each products at each stages on a specified working day is calculated and the work-in-process (WIP) of every product at each stages on the same day is determined. According to these two numbers, the WIP on the next working day can be calculated, and then the move on the next working day is determined. Using this formula, the move of each product at each stage in future is obtained. Also, the summation the moves of all products at all stages on a working day are equal to, the capacity demand of the processing line on that day. The quantity of the throughput of the wafers may thus be determined and the supervisor can decide how to vary the parameters of the processing line.

10 Claims, 4 Drawing Sheets

DYNAMIC CAPACITY DEMAND FORECAST SYSTEM

FIELD OF THE INVENTION

The present invention relates to a method of dispatching for manufacturing the semiconductor integrated circuit, and more specifically, to a method of determining the moves of integrated circuit devices in the FAB on a future day.

BACKGROUND OF THE INVENTION

A typical process in manufacturing the semiconductor integrated circuit requires hundred of steps. These steps include several kinds of stages that are diffusion, lithography, etching, ion implantation, deposition and sputtering. In these kinds of stages, diffusion and implantation generally require longer processing time than other process stages. They need about four to twelve hours. Thus, these stages with long processing time are commonly performed on several wafer lots (commonly referred to as a "batch").

In a semiconductor's processing line, several batches and many kinds of products are put into the processing line continuously at the same time. Thus, many kinds of products are performed on during different kinds of stages in the processing flow, but the processing time of each product is different from each other, thus wafers to be dispatched into one stage of processing flow is the dispatching problem.

For example, there are N kinds of products in a processing flow. When these products are in the etching stage of the processing flow, the equipment number of the etching stage is finite; it may be m equipment. The capacity demand problem of the stages in the processing flow exists, such the numbers of wafer lots are put into the etching stage, or the numbers of wafer lots are put into the processing flow. The problem also includes the prediction of the capacity demand forecast of the processing flow in future.

If the throughput of wafers in one stage is too much then the waiting time of the wafers in the stage is longer than the waiting time in other stages. If the number of working equipment of a stage is too small then the waiting time of the wafers is longer than the waiting time in other stages, too. Thus, the preceding stage will be a bottleneck of a processing flow. However, the manufacturing line is rarely balanced in a semiconductor's foundry Fab, especially in its ramp-up period. The possible reasons may be changeable demand, unstable tool status, unsteady process and/or disaster events. Consequently, bottleneck tools are also varied frequently.

The traditional capacity checking system calculates the tool utilization by assuming linear loading for equipment. However, this assumption is not always true in semiconductor foundry Fab, especially in its ramp-up stage. Accordingly, the traditional method can not work well and the capacity requirement is always biased in a foundry Fab.

FIG. 1A illustrates a traditional capacity checking system. The system is the calculating method of tool capacity requirement (daily moves) assuming linear WIP coming to each tool based on planned product mix and it is a static capacity checking system. This method will lead to a biased capacity plan if WIP was not linearly distributed.

Nevertheless, in semiconductor manufacturing Fab, WIP distribution would not be linear due to the quickly changing demand, poor tool stability and low process capability, especially in its ramp-up period. Mobile bottlenecks commonly exist in such non-linear WIP dirstributed Fab. Therefore, the compatible tools between different stages and product must be allocated in order to reduce the impacts of mobile bottlenecks.

Hence, the traditional capacity checking method is a static method that cannot be suitable semiconductor manufacturing Fab. This method is useful only for a balanced manufacturing line. If this method is applied to an unbalanced manufacturing line; then it cannot calculate the variations of every stage of a process flow for daily changes.

A calculating method of the dynamic capacity demand is needed. The dynamic method considers the variation of a processing flow in every working day, and predicts the capacity demand and forecast of a processing line.

SUMMARY OF THE INVENTION

A calculating method for dynamic capacity demand forecast is disclosed. The method is applied to a processing line. There are N types of products and m types of stages in a processing line. The method calculates the work-in-process (WIP) and a turn ratio of an i-th product at a j-th stage on the k-th day, then uses these two numbers for the formula 35 of the present invention to obtain the WIP and the moves of the i-th product at the j-th stage on the k+1 day, then the WIP and the moves of every product at every stage in future are determined. Consequently the capacity demand in the future is also determined. According to these suggestions, supervisors of the processing line can vary the parameters of the processing line.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

Notice that WIP profile and turn ratio are considered in this invention in stead of fixed prodcut mix in prior arts.

Figure 1A:
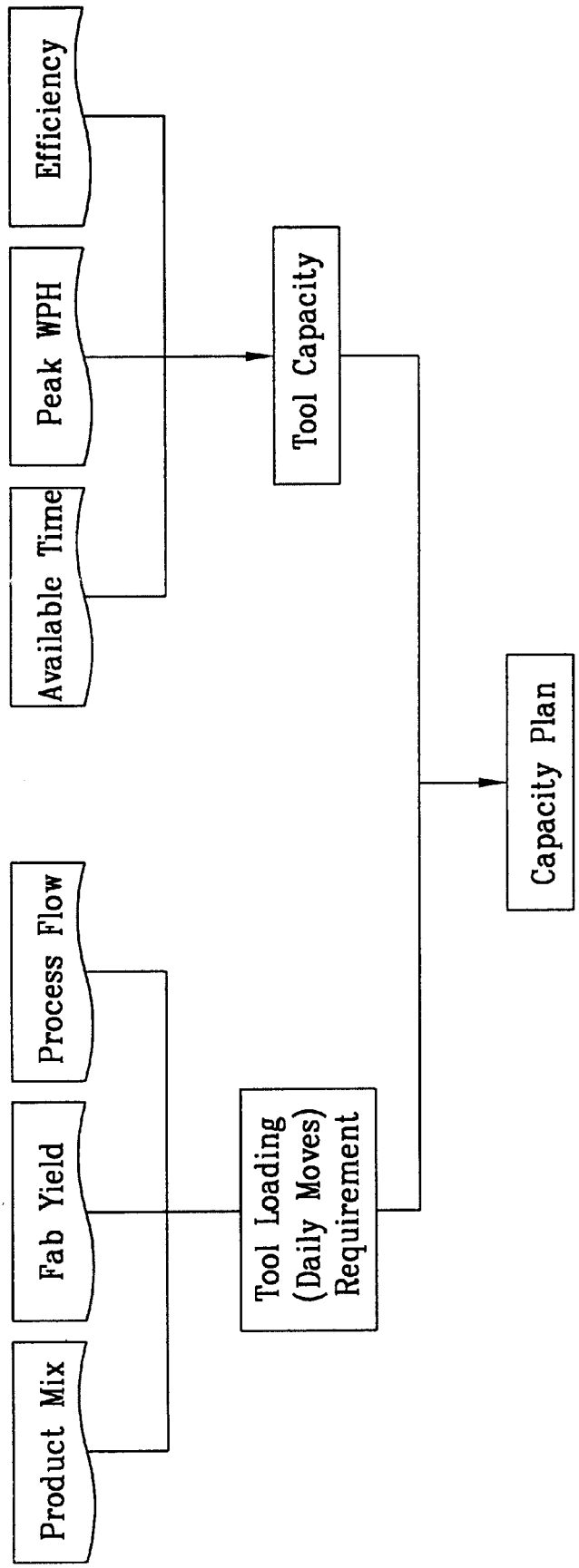
FIG. 1A illustrates the calculation of the move requirement for each tool on a monthly base by using a static capacity checking system in accordance with prior arts.
Figure 1B:
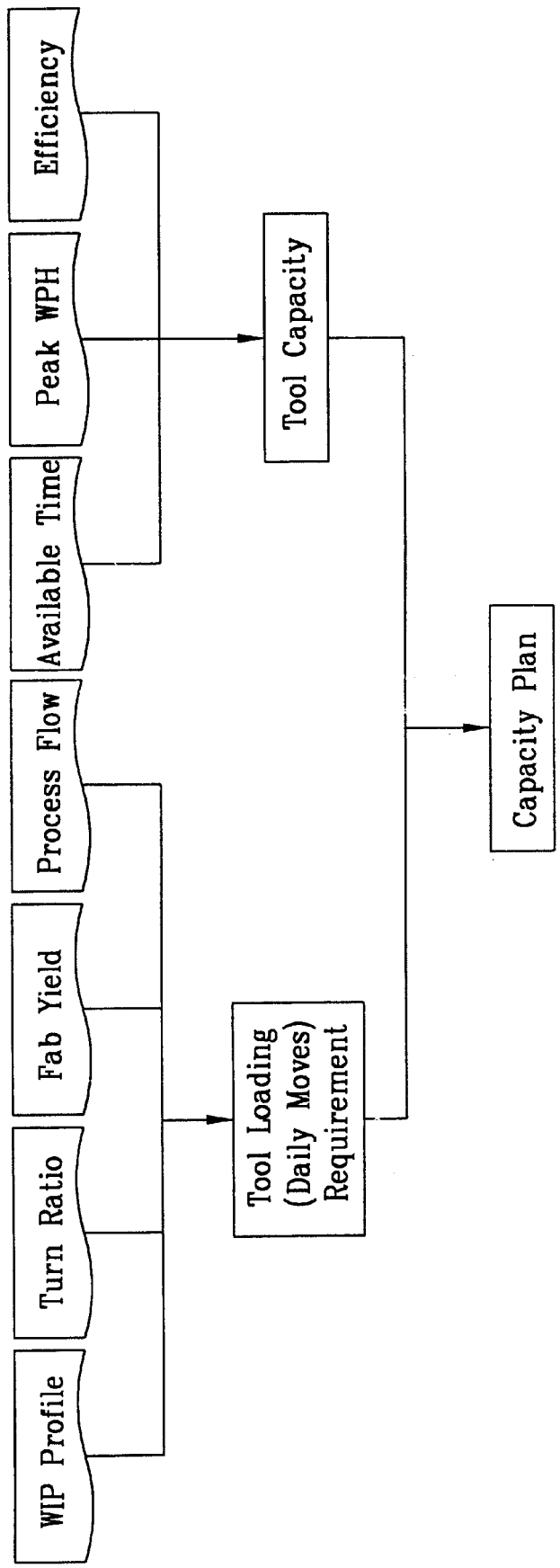
FIG. 1B illustrates the calculation of the move requirement for each tool on the future days by using a dynamic capacity checking system in accordance with the method of this invention.
Figure 2:
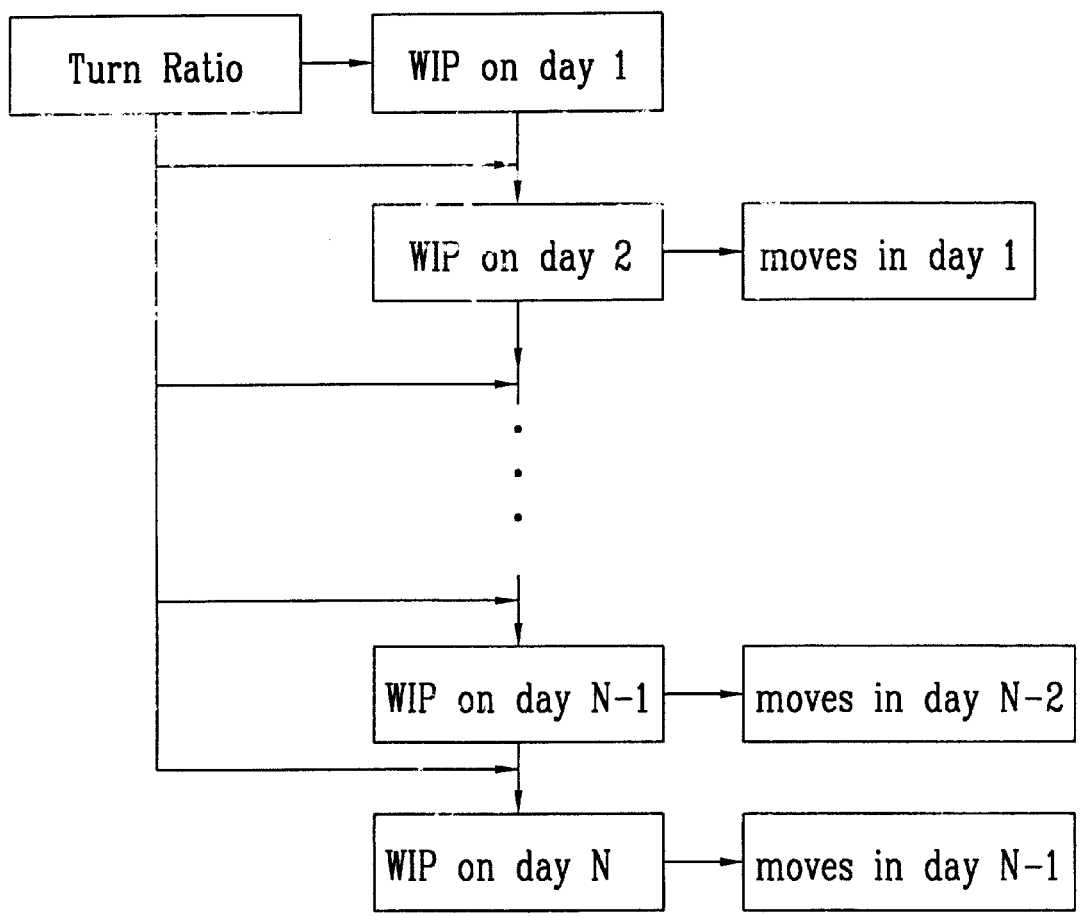
Figure 3:
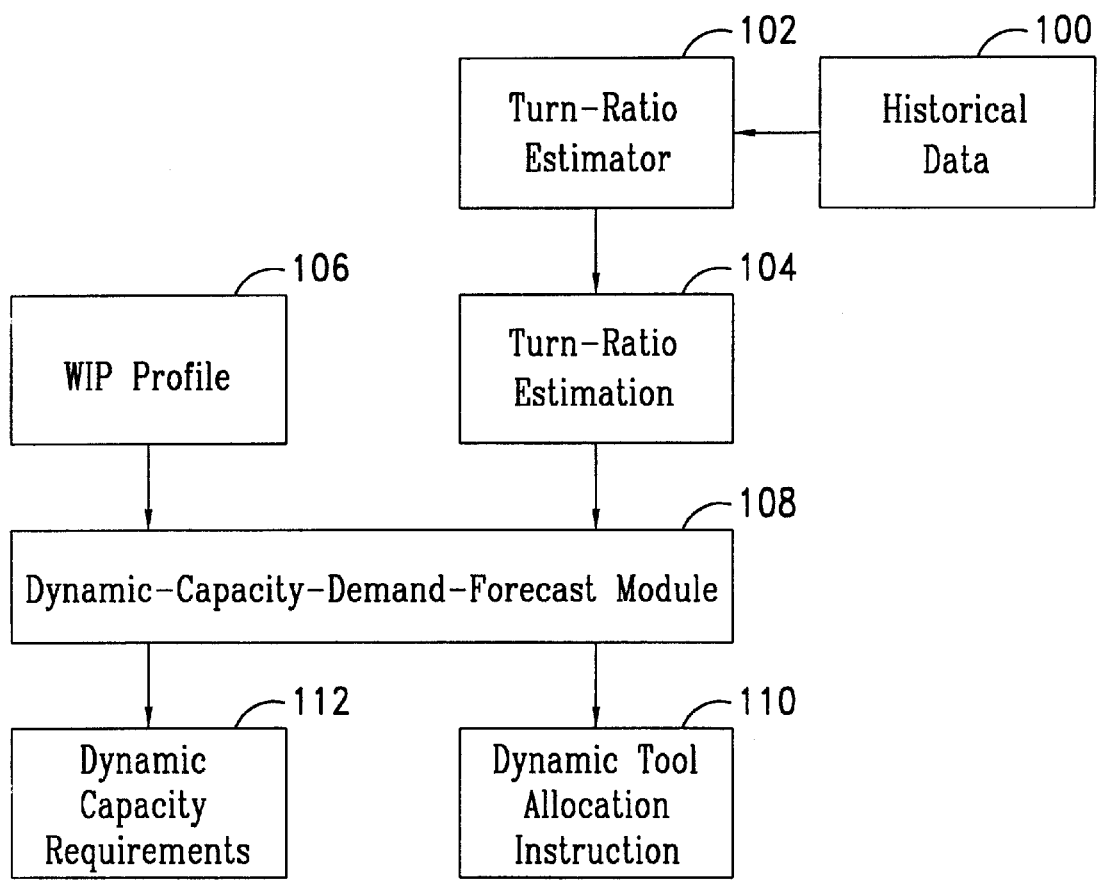

FIG. 2 illustrates the steps in calculating a dynamic capacity demand in accordance with the method of this invention;

FIG. 3 is a flow chart of the dynamical method. It illustrates the function of the dynamic-capacity-demand-forecast module.

DETAILED DESCRIPTION OF THE PREFERRED EMBODIMENT

Referring to FIG. 2, this figure shows the calculating method of a move of a product in a stage of a processing line. The work-in-process (WIP) of day1 and a turn ratio of the processing line are known from a key stage report (KSR) of a semiconductor's factory. The WIP of day2 is known from the WIP data and the turn ratio data then the moves of day1 is then obtained from the WIP data in these two days. According to this method, if the WIP of day N−1 and the moves in day N−2 are known, the WIP in day N and the moves in day N−1 could be calculated. The number of throughput wafers of day N is then determined, and the processing line will be running smoothly. The dynamic calculating method will be described in the following descriptions.

There are i types of products which are processed in j types of stages in a processing line of a semiconductor's manufacturing line. In the semiconductor's FAB, key stage reports are required. It shows the condition of the processing flow. Several parameters of the processing line are known in the key stage reports. For example, the WIP data of a stage in a working day can be found in this report.

Firstly, the turn ratio $T_{ijk}$ of the i-th product at the j-th stage on the k-th day is determined from the key stage report. The definition of the turn ratio is numbers of the stages, which are a product, travels in a working day. That is, the turn ratio is equal to the number of the moves (the unit is batch/day) to divided by the WIP (the unit is stage number/day) so the unit of the turn ratio is: the numbers of stages /day.

The turn ratio $T_{ijk}$ means the speed that the i-th product passes through the j-th stage on the k-th working day, or it means the processing time that the i-th product is at the j-th stage on the k-th day. If the turn-ratio $T_{ijk}$ is small, the speed is slow. If the turn ratio $T_{ijk}$ is small, the processing time is short.

In the present invention, the method of calculating the turn ratio is to take the average of the turn ratios from the same product at the same stage for the ten last working days. The method of calculating the turn ratio is not only the average of the turn ratio in the ten-forgoing days, but also the number of the sampling days is appreciated to be taken into average.

The second step is to determine the work-in-process (WIP) $W_{ijk}$ of the i-th product at the j-th stage on the k-th working day. WIP is found from the key stage report of the processing line, and it means the quantity of the wafers of a specified product at a specified stage on a specified working day.

Thus, there is a table on the k-th working day, which comprises the parameters of a processing line.

TABLE 1

| stage/product | Turn Ratio | 1 | 2 | 3 | ... | N-1 | N |
|---|---|---|---|---|---|---|---|
| 1 | $T_{11k}$ | $_{11k}$ | $W_{21k}$ | $W_{31k}$ | | $W_{(n-1)1k}$ | $W_{n1k}$ |
| 2 | $T_{12k}$ | $_{12k}$ | $W_{22k}$ | $W_{32k}$ | | $W_{(n-1)2k}$ | $W_{n2k}$ |
| ... | ... | ... | ... | ... | ... | ... | ... |
| M | $T_{1mk}$ | $_{1mk}$ | $W_{2mk}$ | $W_{3mk}$ | | $W_{(n-1)mk}$ | $W_{nmk}$ |

Table 1 shows that there are m types of stages and N types of products of a processing line on the k-th working day. In this table, there are WIP and turn ratio of every product at every stage on the k-th working day. The unit of the work-in-process (WIP) is a batch of wafers or one wafer.

The third step is to calculate the move $M_{ijk}$ of the i-th product at the j-th stage on the k-th working day. The formula of calculating moves $M_{ijk}$ is:

$$M_{ijk}=\Sigma[T_{i(j-n)k}\text{-integer}(T_{i(j-n)k})]*W_{i(j-n)k}\text{'}n=1\sim j-1.$$

The calculating formula is to take the numbers firstly, which is the turn ratio minus the integer part of the turn ratio leaving from stage 1 to j-1. The number $[T_{ijk}\text{-integer }(T_{ijk})]$ is the ratio of the i-th product which can not leave to the j-th stage on the k-th day and then the numbers are multiplied to each WIP from stage 1 to stage j-1. The moves $M_{ijk}$ is equal to the summation of these multiples.

The fourth step is to determine a modified moves $M'_{ijk}$'

$$M'_{ijk}=\min[M_{ijk}, (M_{i(j-1)k}+W_{ijk})];$$

The moves of the i-th product at the j-th stage on the k-th day is the summation of the moves of the i-th product at the j-1 stage on the k-th day and the WIP of the i-th product at the j-th stage on the k-th day. Thus, the modified moves $M'_{ijk}$ is smaller or equal to the summation of the i-th product at the j-1 stage on the k-th day and the WIP of the i-th product at the j-th stage on the k-th day. If the calculating method does not follow the formula, the moves of all of the stages in a processing line will be larger than the throughput wafers of the processing line.

The fifth step is to determine the WIP $W_{ij(k+1)}$ of the i-th product at the j-th stage on the k-th day. The formula of calculating $W_{ij(k+1)}$ is:

$$W_{ij(k+1)}=W_{ijk}+M'_{i(j-1)k}-M'_{ijk};$$

The WIP $W_{ij(k+1)}$ is calculated according to the above formula. The calculating method of the WIP of a product at a stage on a day is: the summation of the WIP on the day and the modified moves at the prior one stage on the same day minus the modified moves at the same stage on the same day leaves the WIP of the same product at the same stage on the next day.

The sixth step is to repeat the first step to the fourth step, to calculate the turn ratio and WIP of every products at every stages on the k+1 working day and the modified moves of every products at every stages on the k+1 day.

The above description explains the method of calculating the WIP and the moves for a future day, and then the throughput wafers of the processing line in future can be correctly determined.

For example, there are three process stages in a processing line. The calculation of the capacity demand of the processing line on the k-th day is described in the following calculation. The method is to take the summation of the moves of all the products.

$$M_{jk}=\Sigma M'_{ijk}\text{'}i=1-N;$$

The $M_{jk}$ is the quantity of every product at every stage. By taking the summation of the products at the stages t1, t2 and t3, the capacity demand $T_k$ on the k-th day is obtained. The formula is: $T_k=\Sigma M_{jk}\text{'}j=t1\text{'}t2\text{'}t3$.

According to the above formulas, the capacity demand on the k+n-1 day is:

$$T_{k+n-1}=\Sigma M_{j(k+n-1)},j=t1\text{'}t2\text{'}t3°$$

When the capacity demand of a processing line in future is known, the appreciated quantity of the throughput wafers is put into the processing line and then the processing line is at its best mode and runs smoothly.

FIG. 3 illustrates the function of the dynamical-capacity-demand-forecast module. A historical data 100 is input into a turn-ratio estimator 102, then turn-ratio estimation 102 works. The turn ratio of the processing line is calculated from the historical data 100. The WIP profile 106 of the processing line and the turn ratio of the processing line are input into the dynamic-capacity-demand-forecast module 108, then a dynamic tool's allocating instruction 110 and dynamic capacity requirements 112 are known. According to these two suggestions, the condition of the processing line is varied. Supervisors of the processing line can dispatching the sources of the processing line and shorten the processing time of the products in the processing line.

While the preferred embodiment of the invention has been illustrated and described, it will be appreciated that various changes can be made therein without departing from the spirit and scope of the invention. For example, the samples of the turn ratio are not only the turn ratios of the last ten days, but also the turn ratio of the recent number of days.

What is claimed is:

1. A dynamic forecast method of capacity demand for providing tool capacity demand on a processing line by daily stage moves forecast, said method comprising the steps of:
   a. assigning a work in process $W_{ijk}$ (WIP) of product i at stage j in said processing line in day k, said processing line including n numbers of stages, said stage having a turn ratio $T_{ijk}$;
   b. determining a stage move $M_{ijk}$ of the product i at the stage j in the day k by the steps of:
      i) multiplying a decimal of said turn ratio by a work in process of every stage from stage 1 to stage j;
      ii) calculating the summation of each term multiplied by step i);
   c. revising said stage move $M_{ijk}$ to determine an actual stage move $M'_{ijk}$ according to said $W_{ijk}$, wherein said actual stage move $M'_{ijk}$ is less than or equal to the stage move of previous stage $M_{i(j-1)k}$ plus said $W_{ijk}$; and
   d. determining a work in process $W_{ij(k+1)}$ of the product i at the stage j in day k+1 by calculating the summation of said $W_{ijk}$ and an actual stage move $M'_{i(j-1)k}$ of previous stage minus said actual stage move $M'_{ijk}$.

2. The method of claim 1, wherein the step of determining a stage move $M_{ijk}$ of the product i at the stage j in the day k is calculated by the formula as follows:

$$M_{ijk} = \Box[T_{i(j-n)k} - \text{integer}(T_{i(j-n)k})]*W_{i(j-n)k}, \text{ where n: 1 to (j-1).}$$

3. The method of claim 1, wherein the step of adjusting said stage move $M_{ijk}$ to determine an actual stage move $M'_{ijk}$ is calculated by the formula as follows:

$$M'_{ijk} = \min[M_{ijk}, (M_{i(j-1)k} + W_{ijk})].$$

4. The method of claim 1, wherein the step of determining a work in process $W_{ij(k+1)}$ of the product i at the stage j in day k+1 is calculated by the formula as follows:

$$W_{ij(k+1)} = W_{ijk} + M'_{i(j-1)k} - M'_{ijk}.$$

5. The method of claim 1, further comprising determining a daily move $M'_{ik}$ of the product i in the day k by calculating the summation of said actual stage move of every stage from stage 1 to stage n.

6. The method of claim 1, further comprising determining a capacity forecast demand in the day k by calculating the summation of the moves for all the products at all the stages in the day k.

7. A method of dynamic capacity demand forecast for providing tool allocation instructions on a processing line by using actual stage moves and WIP profiles, said method comprising the steps of:
   a. assigning a work in process $W_{ijk}$ (WIP) of product i at stage j in said processing line in day k, said processing line including n numbers of stages, said stage having a turn ratio $T_{ijk}$ ;
   b. determining a stage move $M_{ijk}$ of the product i at the stage j in the day k by the steps of:
      i) multiplying a decimal of said turn ratio by a work in process of every stage from stage 1 to stage j;
      ii) calculating the summation of each term multiplied by step i);
   c. revising said stage move $M_{ijk}$ to determine an actual stage move $M'_{ijk}$ according to said $W_{ijk}$, wherein said actual stage move $M'_{ijk}$ is less than or equal to the stage move of previous stage $M_{i(j-1)k}$ plus said $W_{ijk}$;
   d. determining a work in process $W_{ij(k+1)}$ of the product i at the stage j in day k+1 by calculating the summation of said $W_{ijk}$ and an actual stage move $M'_{i(j-1)k}$ of previous stage minus said actual stage move $M'_{ijk}$;
   e. determining a daily move M'ik of the product i in the day k by calculating the summation of said actual stage move of every stage from stage 1 to stage n; and
   f. determining a capacity forecast demand in the day k by calculating the summation of the moves for all the products at all the stages in the day k.

8. The method of claim 7, wherein the step of determining a stage move $M_{ijk}$ of the product i at the stage j in the day k is calculated by the formula as follows:

$$M_{ijk} = \Box[T_{i(j-n)k} - \text{integer}(T_{(j-n)k}) ]*W_{i(j-n)k}, \text{ where n: 1 to (j-1).}$$

9. (New) The method of claim 7, wherein the step of adjusting said stage move $M_{ijk}$ to determine an actual stage move $M'_{ijk}$ is calculated by the formula as follows:

$$M'_{ijk} = \min [M_{ijk}, (M_{i(j-1)k} + W_{ijk})].$$

10. The method of claim 7, wherein the step of determining a work in process $W_{ij(k+1)}$ of the product i at the stage j in day k+1 is calculated by the formula as follows:

$$W_{ij(k+1)} = W_{ijk} + M'_{i(j-1)k} - M'_{ijk}.$$

* * * * *